Nov. 16, 1943.     A. B. NEWTON     2,334,216
TEMPERATURE CONTROL SYSTEM
Filed April 4, 1938
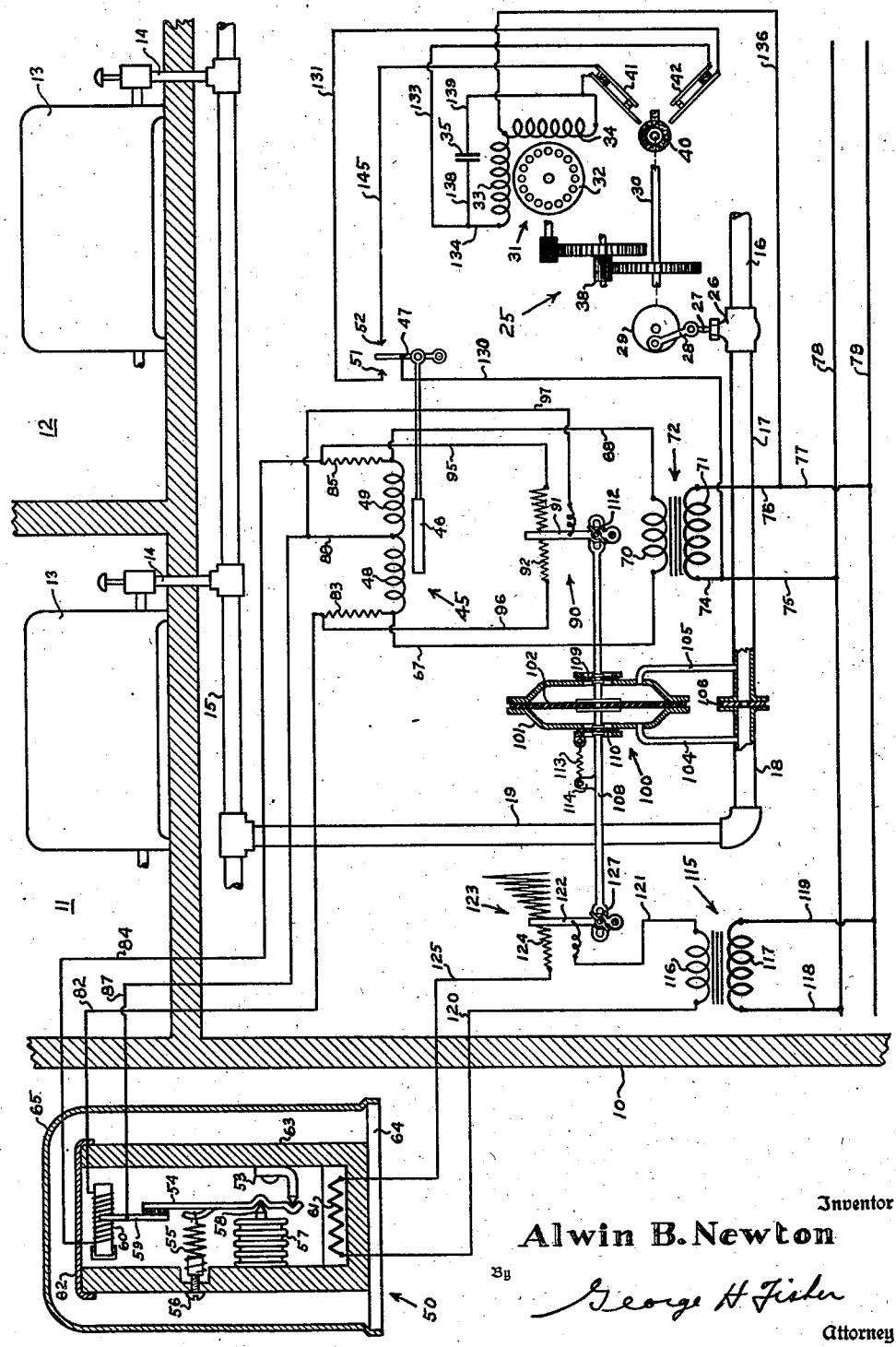
Inventor
Alwin B. Newton
By George H. Fisher
Attorney Patented Nov. 16, 1943

2,334,216

UNITED STATES PATENT OFFICE 2,334,216

TEMPERATURE CONTROL SYSTEM

Alwin B. Newton, Minneapolis, Minn., assignor to Minneapolis-Honeywell Regulator Company, Minneapolis, Minn., a corporation of Delaware Application April 4, 1938, Serial No. 199,743

4 Claims. (Cl. 236—68)

The present invention relates to a temperature control system of the type shown in the patent to D. G. Taylor, 2,073,326, of March 9, 1937.

In the above mentioned Taylor patent, there is disclosed a temperature control system wherein the control of the flow of a heat transferring fluid such as steam is effected in a modulating manner by means including an outdoor controller having a local heating device and a thermostatically actuated control impedance responsive to the temperature of the controller. The heating effects of the local heating means and of the heat device utilizing the steam bear the same relation to each other as the heat losses from the controller and from the building. As the temperature of the controller changes due to a change in outside atmospheric conditions, the position of a flow valve regulating the steam flow is changed and simultaneously the amount of heat supplied to the local heater is also changed. In the specific arrangement of Taylor, a balanced impedance network is employed to control the motor of the flow valve. This network includes a follow-up impedance which has as its function to terminate the movement of the motor when the valve reaches a position corresponding to the position of the control impedance in the outside controller. This motor not only controls the valve but also controls the resistance adjusting the current flow to the local heater.

While the arrangement of Taylor represented a decided advance over earlier temperature control systems, the system has one defect in that the position of the valve and the possible amount of heat supplied to the local heater is fixed for any temperature of the controller. Such an arrangement is satisfactory so long as the steam pressure is constant. This very seldom occurs, however, either in the case where the steam is supplied by a local heating plant or where the steam is supplied from some commercial source. The result of these variations in steam pressure, accordingly, is that there no longer is maintained a definite relation between the steam supplied to the building and the heat supplied by the local heater. This entirely upsets the operation of the system which is dependent upon this fixed relationship between the building heating means and the controller heating means.

An object of the present invention is to provide a temperature control system of a type just discussed in which means responsive to the rate of heat flow is employed to determine the position of the valve in conjunction with the thermostatic control means in the outside controller.

A further object of the present invention is to provide such a system in which a flow responsive means is employed for operating the follow-up impedance.

A further object of the invention is to provide such a system in which a flow responsive means not only controls the rebalancing impedance but also controls the heating effect of the local heating device.

Other objects of the present invention will be apparent from a consideration of the accompanying specification, claims and drawing.

In the single figure of the drawing, the invention is shown in schematic form applied to a building employing a steam heating system.

Referring to the drawing, a building to which the invention is shown as applied is provided with an outside wall 10 and a plurality of rooms 11 and 12. In each of these rooms there is located a radiator 13 or other suitable heat transferring device. A header 14 conducts steam to each of these radiators from a steam supply pipe 15. The pipe 15 is supplied with steam from a supply pipe 16 leading from any suitable source of steam (not shown), through pipes 17, 18, and 19.

The flow of steam between pipes 16 and 17 is controlled by means of a motorized valve 25. This valve comprises a valve proper 26 which is provided with a valve stem 27 connected by means of a link 28 to a crank disc 29. The crank disc 29 is mounted upon a shaft 30 driven by a motor 31. The motor 31 may be of any suitable reversing type, one preferred form being that shown in the co-pending application of Willis H. Gille, Serial No. 131,381, filed March 17, 1937, Patent No. 2,145,791, of January 31, 1939. The motor is shown as comprising a squirrel cage rotor 32 and a pair of field windings 33 and 34. A condenser 35 is associated with the two field windings and is selectively connected in series with one or the other to cause the current through one of the windings to lead that through the other. The rotor 32 is connected through a gear train 38 to the shaft 30. To the right-hand end of shaft 30 there is secured a crank arm 40 of insulating material which is adapted to engage either of two limit switches 41 and 42. The limit switches are provided with long projecting blades which are engaged by the crank arm 40 when the crank arm moves to either of two extreme positions. The engagement of crank arm 40 with the long arm of either of the limit switches results in the switch being opened, terminating the energization of the motor.

A relay generally indicated by the reference numeral 45 controls the connections of the condenser and motor to the source of power. This relay 45 comprises a movable armature member 46 which is subject to the opposing effects of two electromagnetic coils 48 and 49. As long as these coils are equally energized, the armature 46 occupies the mid position shown in the drawing. Upon either of the coils becoming more highly energized, however, the armature 46 is moved in the direction of the more highly energized coil. The armature 46 is connected to a switch blade 47 which is selectively engageable with contacts 51 and 52. Upon relay coil 48 being the more highly energized of the two, switch blade 47 is moved into engagement with contact 51, and upon relay coil 49 being the more highly energized, switch blade 47 is moved into engagement with contact 52.

An outside controller generally designated by the reference numeral 50 controls the relative energization of relay coils 48 and 49. This outside controller is subject to the same atmospheric conditions as the building including temperature, wind, and solar radiation. The controller 50 is shown as comprising a metallic block 63 mounted on a suitable base 64. The block 63 is hollowed out and has secured therein a fulcrum 53. Pivotally mounted on this fulcrum 53 is a lever 54 which is moved in a counter-clockwise direction about the fulcrum 53 by means of an adjustable tension spring 55. The tension spring 55 may be suitably adjusted by manual manipulation of the adjusting screw 56. A bellows 57, which may contain a volatile fluid, is located in the block 63 and carries a plunger 58 which engages the lever 54 to move the lever in a clockwise direction about the fulcrum 53 upon an increase in temperature affecting the bellows 57. A slider 59 is suitably secured to and insulated from the lever 54 so that upon an increase in block temperature affecting the bellows 57, the slider 59 is moved to the right with respect to a potentiometer coil 60 also mounted in the block 63. Upon a decrease in block temperature, the slider 59 is moved towards the left with respect to the potentiometer coil 60. The block 63 is cooled by outside atmospheric conditions, the rate of cooling depending upon outside temperature, wind, and solar radiation and is heated by means of a heating means which may take the form of an electrical heater 61. A cover 62 engages the hollowed out portion of the block 63 so that the thermostatic bellows 57 will not be directly affected by outside atmospheric conditions but will respond directly to the temperature of the block 63. All of the above related parts comprising the outdoor controller 50 may be enclosed within a suitable casing 65 to prevent destruction of the same by the elements.

The two relay coils 48 and 49 are connected by means of conductors 67 and 68 to the opposite terminals of a secondary 70 of a step-down transformer 72. The step-down transformer 72 comprises in addition to the low voltage secondary 70 a line voltage primary 71 which is connected by conductors 74, 75, 76, and 77 to line wires 78 and 79 leading to any suitable source of power (not shown). By reason of the connections between the opposite ends of relay coils 48 and 49 to the secondary 70, these relay coils are connected directly across the secondary constituting the low voltage source of power for the system. As previously indicated, the relative energization of these coils is controlled by the controller 50. The specific means in the controller for effecting the relative energization of the relay coils is the variable impedance constituted by the resistance 60 and the slider 59. The right-hand end of resistance 60 is connected by means of conductor 82 and protective resistance 83 to the left-hand end of relay coil 48. The left-hand end of resistance 60 is, in turn, connected by means of conductor 84 and protective resistance 85 to the left-hand end of relay coil 49. The slider 59 is connected through conductors 87 and 88 to the junction of relay coils 48 and 49. It will be noted that the control potentiometer consisting of resistance 60 and arm 59, by reason of the connections to relay coils 48 and 49, acts as a voltage divider therefor. Thus upon the arm 59 being moved to the right as occurs with a temperature rise, the voltage across the relay coil 48 is decreased and that across relay coil 49 is increased with a resultant decrease and increase in the energizations of the respective coils.

Also controlling the energization of the relay coils 48 and 49 is a rebalancing or follow-up potentiometer 90. This rebalancing potentiometer 90 comprises a contact arm 91 slidably engageable with a resistance 92. The resistance 92 is quadratic in form so that the resistance per unit of length decreases proceeding from right to left. The purpose of this form of the resistance will be discussed in a subsequent paragraph. The right-hand end of resistance 92 is connected through conductor 95 and protective resistance 85 to the right-hand end of potentiometer 49. Similarly, the left-hand end of resistance 92 is connected through conductor 96 and the protective resistance 83 to the left-hand end of relay coil 48. The contact arm 91 is, in turn, connected through conductors 97 and 88 to the junction of relay coils 48 and 49. It will be readily seen that the follow-up potentiometer 90 also acts as a voltage divider for relay coils 48 and 49. Furthermore, it will be readily seen that the effect of the movement to the right of the arm 91 of the follow-up potentiometer has an effect upon the relative energization of relay coils 48 and 49 which is opposite to that produced by a corresponding movement of arm 59. Thus upon the energization of relay coils 48 and 49 being unbalanced by reason of a movement of the controller contact arm 59 in either direction, the balance can be restored by a corresponding movement of arm 91 in the same direction.

A flow responsive device generally indicated by the reference numeral 100 is employed to position the arm 91 of follow-up potentiometer 90. This flow responsive means comprises an enclosed chamber 101 in which is interposed a diaphragm 102 which divides the chamber 101 into two parts. Connected to the chamber on opposite sides of the diaphragm are two pipes 104 and 105. The two steam supply pipes 17 and 18 have interposed between them an orifice plate 106 whereby the flow between the two pipes is restricted. The two pipes 104 and 105 are connected to pipes 17 and 18 on opposite sides of the orifice plate 106 and serve to transmit the pressures on opposite sides of the orifice plate to opposite sides of the diaphragm 102. The position assumed by diaphragm 102 is accordingly a function of the pressure drop through the orifice plate 106. If desired, suitable means can be provided for compensating in changes in the latent heat of the steam and in the change of the orifice effects with change in pressure of the steam. The diaphragm 102 has secured thereto a rod 108. The rod extends through the chamber 101 on opposite sides thereto and at the point where it extends therethrough is connected to sealing diaphragms 109 and 110 which permit longitudinal movement of the rod 108 but prevent escape of fluid therefrom. A tension spring 113 is secured at one end to the casing 101 and at its other end to a lug 114 on the rod 108. This spring serves to bias the rod and diaphragm to the right. The rod 108 is connected at its right-hand end to the arm 91 of the follow-up potentiometer 90 through a pivotal pin and slot connection 112. The pin and slot connection is for the purpose of initially adjusting the position of arm 91 for a given position of the diaphragm 102. In view of the fact that the flow varies as the square root of the pressure drop, it is necessary that the resistance 92 be quadratically formed in order to provide a uniform change in resistance for a uniform change in the flow through orifice 106. By reason of the form of resistance 92, the amount of change in resistance for a given movement of arm 91 constantly decreases as the arm 91 moves from the right to the left, as it does with a constantly increasing pressure drop. Accordingly, the effect is that the relation between the rate of change of flow and the rate of change of resistance becomes a linear one. It is, of course, understood that while the resistance has been shown as formed quadratically, the linear relation between the flow and the resistance may be accomplished by imparting a quadratic movement to contact arm 91, as by means of a suitably formed cam.

A step-down transformer 115 is employed for energizing the electrical heater 61. This step-down transformer comprises a low voltage secondary 116 and a primary 117 which is connected by means of conductors 118 and 119 to the line wires 78 and 79. The left-hand end of secondary 116 is connected directly through conductor 120 to the left-hand end of electrical heater 61. The right-hand end of the secondary 116 is connected through a conductor 121 to the contact arm 122 of a variable resistor 123. The resistor 123 comprises in addition to the contact arm 122 a resistance member 124 which is connected by a conductor 125 to the right-hand end of the heater 61. The resistance member 124 varies from right to left as a function of the fourth power of the length. The arm 122 of variable resistance 123 is connected through a pivotal pin and slot connection 127 to rod 108. The resistance value of rheostat 123 is accordingly varied in accordance with the position of the diaphragm 102. For the same reason as it was necessary to have the resistance 92 varied as the square root of the unit length, it is necessary to have resistance 124 vary as the square root of the unit length. Furthermore, in the case of resistance 124, it is necessary to consider the fact that for a given current the heating effect of the resistor 61 is proportional to the square of the current. Accordingly, in order to obtain a constant change in the heating effect of resistor 61, it is necessary to constantly decrease the change in resistance per unit length. This change must decrease as a function of the square of the unit length. The fact that there are two quadratic conditions with which the resistance 124 must comply results in the necessity of the resistance decreasing as a function of the fourth power of the unit length. With resistance 124 formed in this manner, the relation between the change in flow through orifice plate 106 and the heating effect of the resistance 61 is maintained constant. As in the case of the potentiometer 90, the linear relation may be obtained by means of suitable movement of the contact arm 122. Thus, in the present case, the movement would be as a function of the fourth power of the diaphragm movement.

*Operation*

The various elements of the system are shown in the position which they occupy when a substantially average rate of steam is flowing through the pipes and when the temperature of the controller is at substantially the value for which it is set. Let it be assumed now that the temperature of the block 63 is decreased by reason of a drop in outside temperature. The effect of this decrease in temperature will be to cause the contact arm 59 to move to the left. As previously indicated, the effect of contact arm 59 moving to the left is that the energization of relay coil 48 is increased and that of relay coil 49 decreased, thus causing armature 46 to move to the left and move switch blade 47 into engagement with contact 51.

The moving of relay switch blade 47 into engagement with contact 51 results in the following energizing circuit being established to field winding 33: from line wire 78 through conductors 75 and 130, switch blade 47, contact 51, conductor 131, limit switch 42, conductors 133 and 134, field winding 33 and conductors 136 and 77 to the other line wire 79. At the same time, a circuit is established to the other field winding 34 as follows: from line wire 78 through conductors 75 and 130, switch blade 47, contact 51, conductor 131, limit switch 42, conductors 133 and 138, condenser 35, conductor 139, relay coil 34, and conductors 136 and 77 to the other line wire 79.

It will be noted that in the energizing circuit just traced in the above paragraph, this relay coil 34 included the condenser 35 in series therewith. Thus the field winding 33 is energized directly by current in phase with the source of power whereas the field winding 34 is energized by current which leads that of the source of power by reason of the phase displacing effect of the condenser 35. By reason of the phase displacement between currents to the two motor windings 33 and 34, the motor will rotate in one direction, this direction being such that the shaft 30 is rotated in a clockwise direction to cause a clockwise rotation of the crank disc 29 and of arm 40. The clockwise rotation of the crank disc 29 causes the valve 26 to be moved towards open position. The clockwise movement of the crank 40 if continued sufficiently far will open the switch 42 which, it will be noted, was in the energizing circuits of both motor windings.

The effect of moving valve 26 towards open position is to increase the steam flow through the radiators 13 and incidentally to increase the steam flow through orifice plate 106 with the resultant increase in drop of pressure thereacross. This, in turn, causes diaphragm 102 to be deflected still further to the left against the action of spring 113. The effect of this deflection of diaphragm 102 to the left is to move contact 91 to the left and also to move contact arm 122 to the left. The movement of contact arm 91 to the left causes the resistance on the left-hand side of contact arm 92 to decrease and that on the right-hand side to increase. This tends to cause an increase in the energization of relay coil 49 and a decrease in the energization of relay coil 48 to counteract the effect of the movement to the left of contact arm 59 on resistance 60. After the flow has been decreased to a point corresponding to the position of contact arm 59, the movement of contact arm 91 will be sufficient to rebalance the energization of the relay coils 48 and 49, causing switch blade 47 to again separate from contact 51 and deenergize the controller 31.

The movement of contact arm 122 to the left on resistance 124 results in the current to heater 61 being increased. It will be noted that a direct relation is maintained between the flow of heat conducting fluid to the radiators 13 and the heating effect of resistance heater 61. Moreover, it will be noted that the position at which the valve movement is terminated is determined not by the position of the valve itself but by the flow which results from the valve being in that position. In other words, instead of there being a given valve position for a given position of contact arm 59, there is a given flow of heat conducting medium.

If as a result of the increased flow of heat conducting medium and the accompanying increased heating effect of heater 61, the temperature in the outside controller begins to rise the contact arm 59 will move to the right. This will result in the energization of relay coil 49 being increased and that of relay coil 48 decreased, causing armature 46 to move to the left to move switch blade 47 into engagement with contact 52. This will cause the following circuit to be established to the motor field winding 34: from line wire 78 through conductors 75 and 130, switch blade 47, contact 52, conductor 145, limit switch 41, field winding 34, and conductors 136 and 77 to the other line wire 79. At the same time, an energizing circuit is established to field winding 33 as follows: from line wire 78 through conductors 75 and 130, switch blade 47, contact 52, conductor 145, limit switch 41, conductor 139, condenser 35, conductors 138 and 134, field winding 33 and conductors 136 and 77 to the other line wire 79. It will be noted that as the result of the establishment of the circuits above traced, the current through field winding 33 now leads that through field winding 34 so that the motor will rotate in the opposite direction to that in the case previously discussed. Under these conditions, the shaft 30 will rotate in a counter-clockwise direction to move valve 26 towards closed position. At the same time, the crank arm 40 is moved in a counter-clockwise direction. If such movement of crank arm 40 continues sufficiently long the limit switch 41 will be opened interrupting both of the motor energizing circuits just traced.

The movement of valve 26 towards closed position decreases the flow of steam through the pipes and consequently through the orifice 106. The result of this is that the pressure differential on opposite sides of diaphragm 102 is decreased so that diaphragm 102 and rod 108 are moved towards the right by the action of spring 113. The movement of rod 108 towards the right causes both contact arms 91 and 122 to similarly move to the right upon their respective resistances.

The movement of contact arm 91 to the right has such an effect upon the relative energization of relay coils 48 and 49 as to tend to counteract the movement of arm 49 to the right upon resistance 60. The result is that after the flow has been decreased by an amount corresponding to the rise in temperature, the relay coils 48 and 49 will be again rebalanced causing switch blade 47 to move out of engagement with contact 52, thus deenergizing the motor 31. The movement of contact arm 122 to the right increases the resistance in series with the resistance heater 61, decreasing the heating effect of the same.

It will be noted from the above description that upon any change in temperature of the controller, the heating effects of the heating means for the building and of the electrical heater are correspondingly changed. The amount of change necessary, moreover, is determined not by the position of the valve which is not a definite indication of the actual heating effect but rather by the rate of flow of the heating medium. Thus for any temperature of the controller there is a definite rate of flow of the heating medium. Thus regardless of changes in the supply pressure of the steam or regardless of changes and conditions in the return lines from the radiators, the amount of heat supplied to the radiators will always be determined solely by the temperature of the controller.

While I have shown a specific embodiment of my invention, it is to be understood that this is for purposes of illustration only and that the invention is limited only by the scope of the appended claims.

I claim as my invention:

1. In a system for controlling the supply of a fluid heating medium through a conduit to a building heating system, a valve for controlling the flow of said fluid heating medium through said conduit, electrically operated means for controlling the position of said valve, an outdoor controller located outside the building and subjected to substantially the same atmospheric conditions as the building, said outdoor controller having heating means therefor and a thermostatically controlled variable resistance responsive to the temperature of the controller, a follow-up variable resistance, a control circuit for said valve controlling means including said thermostatically controlled variable resistance and said follow-up resistance, means responsive to the pressure differential across a portion of said system for adjusting the relative amounts of said follow-up resistance in said control circuit by amounts substantially proportional to the square of the variations in said pressure differential so that said valve controlling means is caused to adjust said valve in accordance with the actual rate of flow of fluid, proportioning means mechanically connected to and directly operated by said pressure differential responsive means for controlling the supply of heat to said outdoor controller, said proportioning means and said pressure differential responsive means causing the ratio between the heating fluid delivery to the building and the heat delivery to the outdoor controller to be substantially equal to the ratio between heat loss to the building and heat loss to the outdoor controller when the building and outdoor controller are substantially equal in temperature.

2. In a system for controlling the supply of a fluid heating medium through a conduit to a building heating system, a valve for controlling the flow of said fluid heating medium through said conduit, electrically operated means for controlling the position of said valve, an outdoor controller located outside the building and subjected to substantially the same atmospheric conditions as the building, said outdoor controller having electrical heating means therefor and a thermostatically controlled variable resistance responsive to the temperature of the controller, a follow-up variable resistance, a control circuit for said valve controlling means including said thermostatically controlled variable resistance and said follow-up resistance, means responsive to the pressure differential across a portion of said system for adjusting the relative amounts of said follow-up resistance in said control circuit by amounts substantially proportional to the square of the variations in said pressure differential so that said valve controlling means is caused to adjust said valve in accordance with the actual rate of flow of fluid, a variable resistance mechanically operated by said pressure differential responsive means for controlling the supply of current to said electrical heating means in said outdoor controller, said pressure differential responsive means acting to vary said last-named resistance in accordance with the fourth power of the variations of said pressure differential to cause the delivery of heat to the building and to the controller to vary substantially in direct proportion.

3. In a system for controlling the supply of a fluid heating medium through a conduit to a building heating system, a valve for controlling the flow of said fluid heating medium through said conduit, an outdoor controller located outside the building and subjected to substantially the same atmospheric conditions as the building, said outdoor controller having electrical heating means therefor and temperature responsive means responsive to the temperature thereof, means responsive to the differential pressure across a portion of said system, an electrical control system for said valve controlled by said differential pressure responsive means and said temperature responsive means to variably position said valve in a manner to maintain different flows of fluid through said conduit in accordance with variations in the temperature of said controller, and variable resistance means for determining the current flow to said electrical heating means directly operated by said differential pressure responsive means, in a manner to vary the current flow to said electrical heating means in accordance with the fourth power of the variations in said pressure differential.

4. In a system for controlling the supply of fluid heating medium through a conduit to a building heating system, a valve for controlling the flow of said fluid heating medium through said conduit, an outdoor controller located outside the building and subjected to substantially the same atmospheric conditions as the building, said outdoor controller having electrical heating means therefor and temperature responsive means responsive to the temperature thereof, means responsive to the differential pressure across a portion of said system, an electrical control system for said valve including said differential pressure responsive means and said temperature responsive means to variably position said valve in a manner to maintain different flows of fluid through said conduit in accordance with variations in the temperature of said controller, variable resistance means for determining the current flow to said electrical heating means, and means by which the value of said resistance means is directly varied by said differential responsive means in a manner to vary the current flow to said electrical heating means in accordance with the fourth power of the variations in said pressure differential.

ALWIN B. NEWTON.